United States Patent [19]

Quick

[11] 4,154,047
[45] May 15, 1979

[54] MOBILE SUGAR CANE HARVESTER

[75] Inventor: Donald J. Quick, Bundaberg, Australia

[73] Assignee: Massey-Ferguson Services N.V., Curacao, Netherlands Antilles

[21] Appl. No.: 820,495

[22] Filed: Jul. 29, 1977

[30] Foreign Application Priority Data

Aug. 11, 1976 [GB] United Kingdom ............... 33325/76

[51] Int. Cl.² .......................................... A01D 45/10
[52] U.S. Cl. ......................................... 56/13.9; 56/53
[58] Field of Search .................... 56/13.9, 13.5, 53–119

[56] References Cited

U.S. PATENT DOCUMENTS 4,008,557  2/1977  Ruback et al. .......................... 56/63

FOREIGN PATENT DOCUMENTS 2543025  4/1976  Fed. Rep. of Germany ............ 56/13.9

Primary Examiner—Russell R. Kinsey
Attorney, Agent, or Firm—Robert L. Farris

[57] ABSTRACT

Sugar cane harvester has stick alignment device mounted at forward end of harvester crop feed passage to promote longitudinal alignment of canes with said passage. The device comprises an arm mounted centrally in the passage and carrying driven sprockets and a chain. Cane stick engaging bars project from the chain to comb cane sticks into alignment with the passage.

8 Claims, 3 Drawing Figures

MOBILE SUGAR CANE HARVESTER

This invention relates to mobile harvesters for sugar cane or similar crops such as bamboo.

A problem that arises in sugar cane harvesting is that the stalks or stems of the crop are not always standing up straight and vertically when they are harvested. It is usually the case that some, if not all, of the crop is at least partially prostrate as a result of wind or rodent action or other factors. Furthermore the stalks in any case do not all grow straight and tend to become tangled during the growing season.

It will thus be appreciated that a mobile cane harvesting machine is frequently faced with the task of harvesting a tangled mass of cane sticks. When such a crop is heavy e.g. over 50 long tons per acre, it represents a significant problem even to get the cane stalks or sticks into the harvester, particularly in the case of 2-way harvesters which are limited in width by the cane row spacings.

It is an object of the present invention to provide a harvester for sugar cane or similar crops having improved performance as regards the feeding-in of cane sticks.

According to the invention there is provided a mobile harvester for sugar cane or similar crops comprising:
structure defining a crop feed passage;
base cutting means positioned to sever crop sticks from their roots as the sticks pass through the crop feed passage; and
stick cutting means operative to cut said severed crop sticks into two or more pieces;
characterized by
stick alignment means comprising drivable stick engaging elements positioned forwardly of said base cutting means and engageable with non-upright crop sticks and operative to promote alignment of said non-upright crop sticks with said feed passage.

The provision of stick alignment means operative to promote alignment of crop sticks with the feed passage of the harvester renders a crop comprising tangled crop sticks a closer approximation to upright crop sticks (which represent the ideal crop condition).

An embodiment of the invention will now be described by way of example with reference to the accompanying drawings in which.

Figure 1:
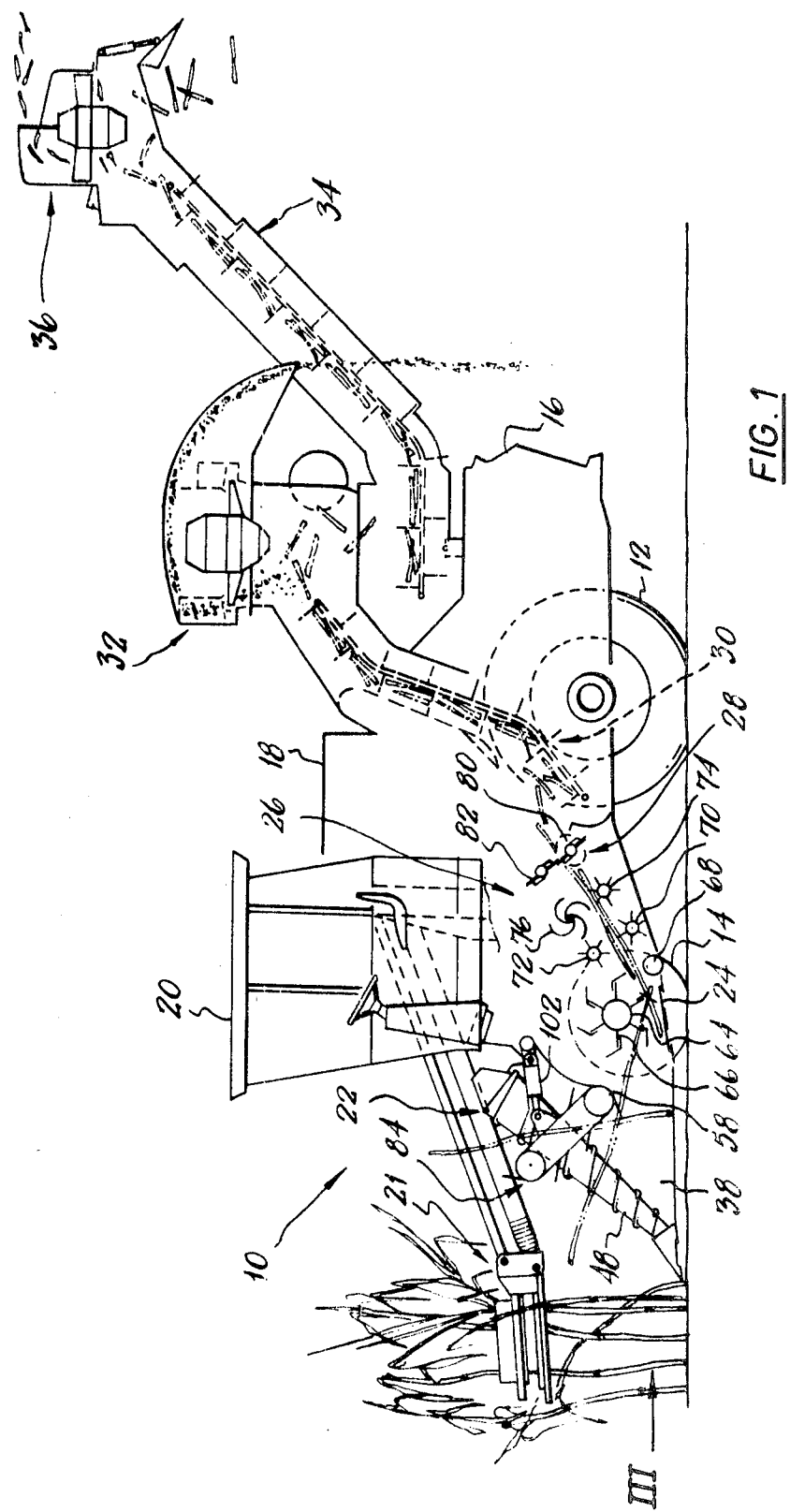
FIG. 1 shows a sugar cane harvester longitudinally-sectioned to reveal its internal crop handling apparatus.

Referring to FIG. 1, a mobile sugar cane harvester 10 (which could also be used for harvesting bamboo and similar crops) comprises rear traction wheels 12, forward steerable wheels 14, a housing 16 for a diesel engine, a radiator and air cleaner assembly 18 for the engine, and a driver's control cab 20.

The crop handling and treatment apparatus of harvester 10 comprises:
crop topping means 21 to sever the leafy tops from standing cane sticks;
crop gathering means 22 at the forward end of the harvester;
base cutting means 24 positioned to sever gathered crop sticks from their roots;
stick feeding means 26 to feed severed cane sticks rearwards through the harvester;
stick cutting or chopping means 28 operative to cut the cane sticks into billets 30 to 40 centimeters in length;
a chain and slat-type primary billet elevator 30 and associated primary trash removal apparatus 32; and
a chain and slat-type secondary billet elevator 34 and associated secondary trash removal apparatus 36.

The present invention is primarily concerned with crop gathering means 22 and its relationship to base cutting means 24, stick feeding means 26 and stick chopping means 28. These portions of the harvester 10 will now be described in more detail.

Figure 3:
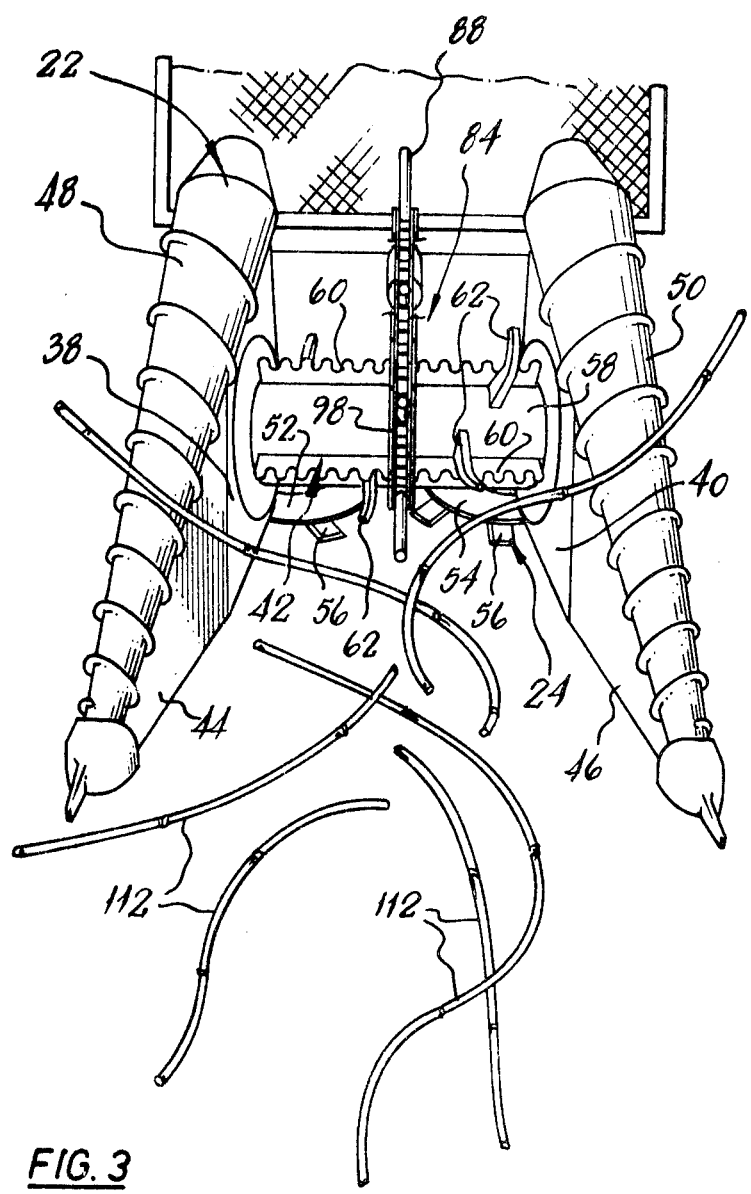
FIG. 3 shows a front perspective view of the harvester, the direction of viewing being indicated by arrow III in FIG. 1.

Crop gathering means 22 comprises (as shown in FIG. 3) laterally-spaced upright walls 38, 40 defining a crop feed passage 42 extending longitudinally through the harvester. The forward portions 44, 46 of walls 38, 40 respectively converge rearwardly and define a crop gathering throat and are surmounted by downwardly and forwardly sloping stick lifting means in the form of tapering power-rotatable augers 48, 50.

As shown in FIG. 3, base cutting means 24 comprises a pair of contra-rotatable discs 52, 54 carrying projecting blades 56 which enter the crop feed passage 42 forward of the axes of rotation of the discs. The discs rotate about upwardly-extending and slightly converging axes. The blades sever from their roots, the row of sticks passing into feed passage 42.

A series of power-rotatable stick feeding rollers are mounted between walls 38, 40. These rollers consist of a forward feed roller 58 having three scalloped paddles 60 and a series of curved prongs or spikes 62, a power feed roller 64 also having scalloped paddles and prongs or spikes 66, a butt lifter roller 68, and two pairs of paddle-type feed rollers 70, 72 and 74, 76, roller 76 having flexibly-mounted paddles to accommodate varying amounts of cane being fed through the harvester.

A forwardly-tapering horizontal sill plate (not shown) is mounted between base cutting discs 52, 54 and butt lifter roller 68 to provide a platform for the cane butts in passing from the base cutters to the butt lifter roller.

Stick chopping means 28 comprises a pair of contra-rotatable in-running chopper drums 80, 82. The drums rotate about spaced parallel axes and are driven in timed relationship by intermeshing gears (not shown). A pair of axially extending blades are mounted on opposite sides of each drum. Each blade meshes with a blade on the other drum as the drums rotate, thereby cutting the cane sticks into billets of length 30 to 40 centimeters.

Mounted forwardly of base cutting means 24 on forward feed roller 58 and forming part of crop gathering means 22 is stick alignment means 84. The stick alignment means comprises a forwardly projecting arm 86 carrying drivable stick-engagement elements 88 which move or circulate in a vertical plane to promote alignment with feed passage 42 of non-upright cane sticks.

Figure 2:
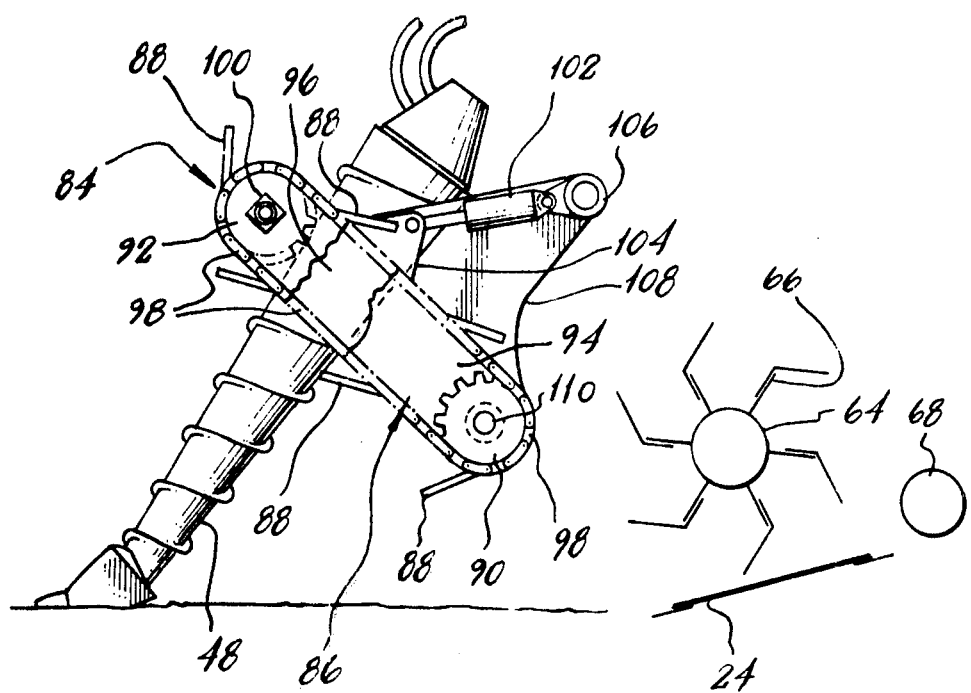
FIG. 2 shows a portion of FIG. 1 on a larger scale.

As shown in FIGS. 2 and 3, stick alignment means 84 comprises a drive sprocket 90, a driven sprocket 92, a pair of side plates 94, 96, and a chain 98 trained round the sprockets on which stick-engaging elements 88 which are in the form of bars are mounted, and from which they project.

Drive sprocket 90 is mounted centrally of the axial length of forward feed roller 58 which is thus divided into halves, and is driven thereby. Chain 98 is thus positioned centrally between the opposite sides of crop feed passage 42.

It will be noted that the stick-engaging bars 88 are mounted on chain 98 in a trailing attitude with respect to the direction of drive of the chain. The bars are secured to the chain at spacings of 15 to 30 centimeters along the length thereof and are themselves from 7.5 to 15 centimeters in length—the spacing and length depending on crop conditions.

Side plates 94, 96 are journalled on the central shaft (not shown) of forward feed roller 58, one on each side of sprocket 90, and project forwardly therefrom on each side of chain 98. At their forward ends, the side plates support bearings 100 for driven sprocket 92.

Thus arm 86 (comprising side plates 94, 96, sprockets 90, 92, chain 98 and stick engaging bars 88) is freely pivoted on forward feed roller 58. This permits height adjustment of the arm.

A height adjustment mechanism for arm 86 is provided comprising motor means in the form of a hydraulic ram 102 which is pivotally connected at its forward end to a bracket 104 projecting from side plates 94, 96 and is pivotally connected at its rear end to the frame 106 of the harvester. Plates 108 are provided on each side of the ram to prevent it becoming tangled with the crop. Extension and retraction of ram 102 pivots arm 86 about the axis 110 of forward feed roller 58 so as to lower and raise the arm.

In use, sprawling cane sticks 112 are lifted by the power-rotated lifting augers 48, 50 and then engaged by bars 88 on chain 98 which pull the sticks into the harvester's feed passage 42, thereby changing their alignment from (in many cases) almost transverse to crop feed passage 42, to approximately in line with the passage—in so far as non-straight cane sticks can be in-line with the passage.

The cane sticks are then severed from their roots by base cutters 24 and fed to chopper drums 80, 82 where they are chopped into billets before being subjected to two trash removal stages by elevators 30, 34 and their associated sets of trash removal apparatus 32 and 36 respectively.

It will be seen that stick alignment means is constructed and positioned so as to exert an alignment effect on tangled and sprawled canes by a combing action very early in the harvesting process i.e. as soon as, or in some cases before, the sticks enter the crop gathering throat of the harvester, for from FIG. 2 it can be seen that the stick engaging elements move in a path which passes across the stick lifting means (augers 48, 50) as viewed in a direction at right angles to the direction of forward motion of the harvester.

Furthermore, when arm 86 is swung downwards by means of ram 102 to a lowered position it is effective to help break up bundles of tangled cane, thereby improving the feeding of cane into the harvester.

I claim:

1. A mobile harvester for sugar cane including a frame, ground engaging support means attached to and supporting the frame, a pair of laterally-spaced upright walls attached to the frame and defining a crop feed passage, base cutting means mounted on the frame and extending into the space between said walls for severing cane sticks from their roots, and cane stick alignment means for feeding cane sticks into the crop feed passage including a driven shaft rotatably journaled on the frame and extending generally horizontally from one of said walls to the other, a sprocket mounted on the driven shaft, an idler sprocket rotatably supported on the frame by an idler sprocket support means, a chain trained around the sprocket on the driven shaft and the idler sprocket and a plurality of cane stick-engaging spike elements attached to the chain for engaging cane sticks and aligning them with the crop feed passage.

2. The mobile harvester for sugar cane of claim 1 wherein the idler sprocket support means is rotatably journaled on said frame for pivotal movement about the axis of rotation of said driven shaft.

3. The mobile harvester for sugar cane of claim 2 wherein adjusting means are mounted on the frame for pivoting the idler sprocket support about the axis of rotation of said driven shaft.

4. The mobile harvester for sugar cane of claim 3 wherein the adjusting means includes a hydraulic cylinder attached to the frame and to the idler sprocket support.

5. The mobile harvester for sugar cane of claim 1 wherein the sprocket mounted on the driven shaft is approximately mid way between the pair of spaced upright walls which define a crop feed passage.

6. The mobile harvester for sugar cane of claim 5 wherein the driven shaft of the cane stick alignment means is mounted on the frame above and forward of the base cutting means.

7. The mobile harvester for sugar cane of claim 1 wherein the driven shaft of the cane stick alignment means is mounted on the frame above and forward of the base cutting means.

8. The mobile harvester for sugar cane of claim 1 including adjustment means for vertically adjusting the position of said idler sprocket.

* * * * *